United States Patent [19]
Reedy

[11] Patent Number: 5,659,970
[45] Date of Patent: Aug. 26, 1997

[54] END HOOK FOR POWER RETURN TAPE MEASURE

[75] Inventor: Marvin W. Reedy, Sanford, N.C.

[73] Assignee: Cooper Industries, Inc., Houston, Tex.

[21] Appl. No.: 655,232

[22] Filed: Jun. 5, 1996

[51] Int. Cl.⁶ .................................................. G01B 3/10
[52] U.S. Cl. .................................. 33/758; 33/755
[58] Field of Search ........................ 33/755, 757–771

[56] References Cited

U.S. PATENT DOCUMENTS

| | | | |
|---|---|---|---|
| 2,686,367 | 8/1954 | Staggs | 33/769 |
| 3,210,850 | 10/1965 | Grzyb. | |
| 3,362,075 | 1/1968 | Quenot. | |
| 4,023,277 | 5/1977 | Fizer | 33/761 |
| 4,930,227 | 6/1990 | Ketchpel. | |
| 5,010,657 | 4/1991 | Knapp | 33/755 |
| 5,386,643 | 2/1995 | Corcoran | 33/762 |
| 5,402,583 | 4/1995 | Komura. | |
| 5,416,978 | 5/1995 | Kaufman. | |

Primary Examiner—Thomas B. Will
Attorney, Agent, or Firm—Burns, Doane, Swecker & Mathis, L.L.P.

[57] ABSTRACT

An end hook for a power return tape measure includes a shank having a longitudinal axis and a catch extending from the shank at an angle to the longitudinal axis. The shank being arcuately shaped about the longitudinal axis, and has a plurality of rivet mounting holes, the mounting holes positioned on each side of the longitudinal axis and spaced laterally from the longitudinal axis. The fastening holes of the shank have a greater longitudinal spacing than mounting holes in a measuring tape so that movement of the end hook longitudinally toward an end edge of the free end of the measuring tape during a collision in power return causes the holes in the end hook nearest the end edge to contact the fasteners before the holes furthest from the end edge.

16 Claims, 2 Drawing Sheets

END HOOK FOR POWER RETURN TAPE MEASURE

FIELD OF THE INVENTION

The present invention is directed to tape measures. More particularly, the invention is directed to an end hook for a tape measure having a power return mechanism.

BACKGROUND

Power return tape measures commonly experience breaking of the free end of the measuring tape at the location where an end hook is fastened. Typically, an extended tape is returned to the housing by releasing a locking mechanism and allowing the return mechanism to retract the tape into the housing. The returning movement of the tape is stopped when the end hook strikes the housing. The collision of the end hook with the housing transmits a shock from the end hook through the fastening rivets to the measuring tape. After repeated collisions the tape material (usually steel) fails at the mounting rivets and the tape breaks.

SUMMARY OF THE INVENTION

The present invention provides a solution to the problem of failure at the end of the tape by better distribution of the collision shock to the tape.

The present invention also provides an end hook in which the fastening of the end hook to the tape is designed to minimized stresses introduced in the tape when fastening the end hook to the tape.

According to the invention, an end hook for a power return tape measure comprises a shank portion arcuately shaped about a longitudinal axis and a catch portion extending at an angle from the shank portion. The end hook and tape are formed with holes in a matching pattern so that the end hook is positionable on the tape with the respective holes aligned in pairs to accept a fastener.

According to one aspect of the invention, all of the holes on the shank of the end hook are spaced laterally from the longitudinal axis of the end hook. The holes in the measuring tape are similarly spaced from a longitudinal axis of the tape. The holes are positioned on a portion of the end hook and tape where the radius of curvature is relative large, that is, a portion of the tape which is relatively flat compared to its curvature at the longitudinal axis. Positioning the fastening holes away from the longitudinal axis minimizes mechanical stress introduced into the measuring tape by the fastener.

In a preferred embodiment, four holes in a rectangular pattern are provided on the end hook and a corresponding four holes in an identical pattern are provided on the tape. The holes are preferably arranged in two parallel, longitudinally spaced rows which spreads the collision force over a large area of the tape.

According to another aspect of the invention, the holes in the shank are slot shaped, being longer in the longitudinal direction than in the lateral direction.

According to yet another aspect of the invention, a longitudinal spacing of the holes in the shank is greater than a longitudinal spacing of the holes in the measuring tape. This helps control the distribution of shock forces from the end hook collision to be transmitted first to the rivets in the holes nearest the catch of the end hook. The tape stretches slightly and the rivets in the holes farther away from the catch then take up the force. Control of the distribution of the force in this manner has been found to greatly extend the service life of the measuring tape.

Another aspect of the invention is in the shape of the bend between the shank and the catch portion of the end hook. The bend is J-shaped, that is, from the shank the hook first bends in a first direction to form a ridge of small radius, then bends in the opposite direction to form the catch. The ridge at the end of the shank defines a small recess between the end of the shank and the main part of the catch. The recess accommodates the end edge of the measuring tape so that when the end hook is moved in the direction of the tape, no bending or distortion of the end edge is caused by the shank. This is advantageous in inside dimension measurements made by abutting the end of the hook against an object.

BRIEF DESCRIPTION OF THE DRAWINGS

The invention will become better understood through the following description in conjunction with the appended drawings, in which.

DETAILED DESCRIPTION

The invention is described in conjunction with a power return tape measure, for which the end hook according to the invention is particularly advantageous. The end hook may also be used for other types of tape measures, and the following description is meant to be illustrative rather than limiting.

Figure 1:
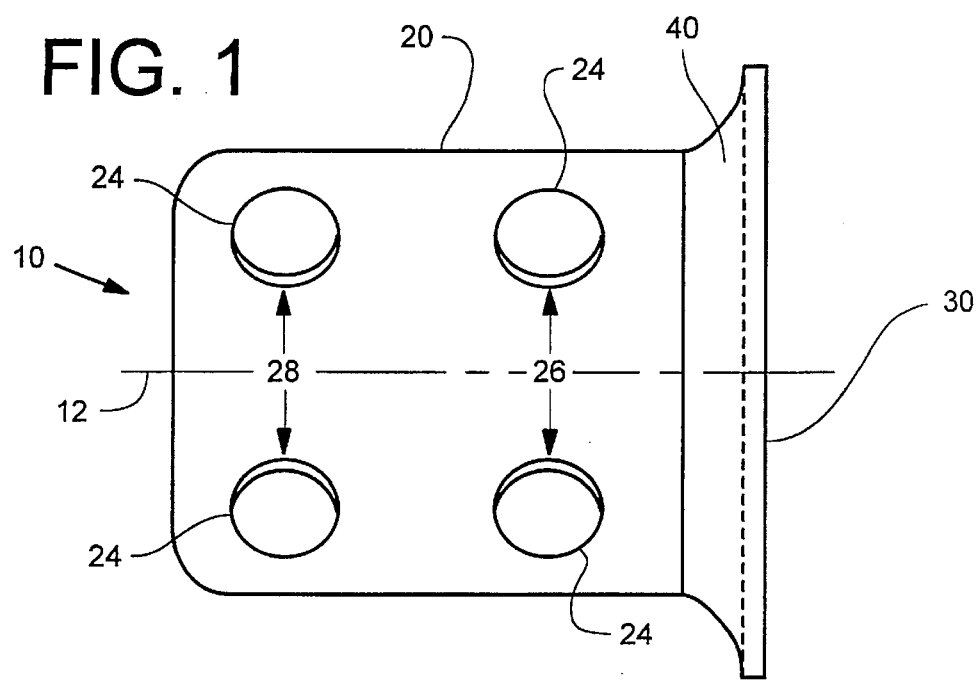
FIG. 1 is a top view of an end hook in accordance with the invention.
Figure 2:
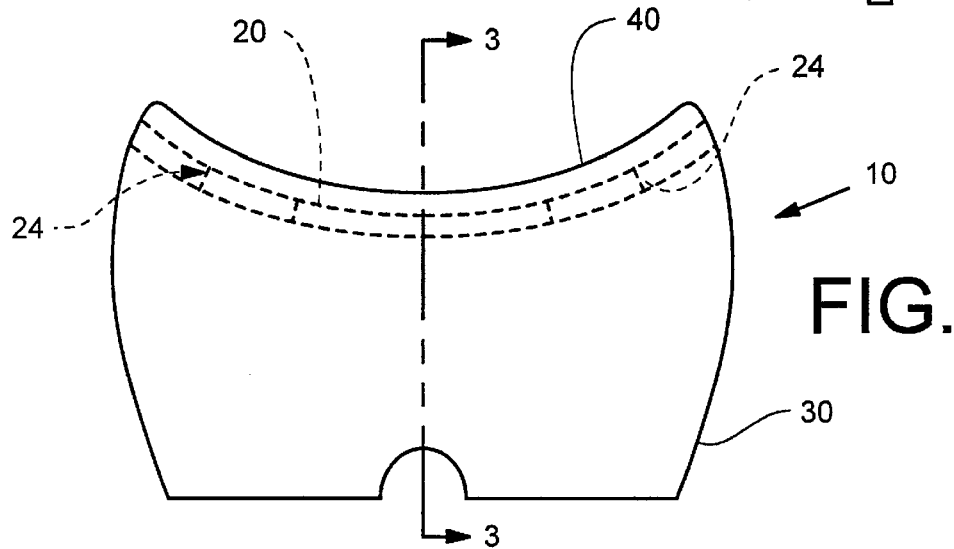
FIG. 2 is an end view of the end hook of FIG. 1.

An end hook 10 according the invention is shown in top view in FIG. 1 and an end view in FIG. 2. The end hook 10 is formed from a rigid material, for example, steel, and is shaped to have a shank 20 and a catch 30. The end hook 10 has a bend between the shank 20 and the catch 30 so that the catch 30 is at an angle to the shank 20. In the embodiment shown, the catch 30 is perpendicular to the shank 20.

Figure 3:
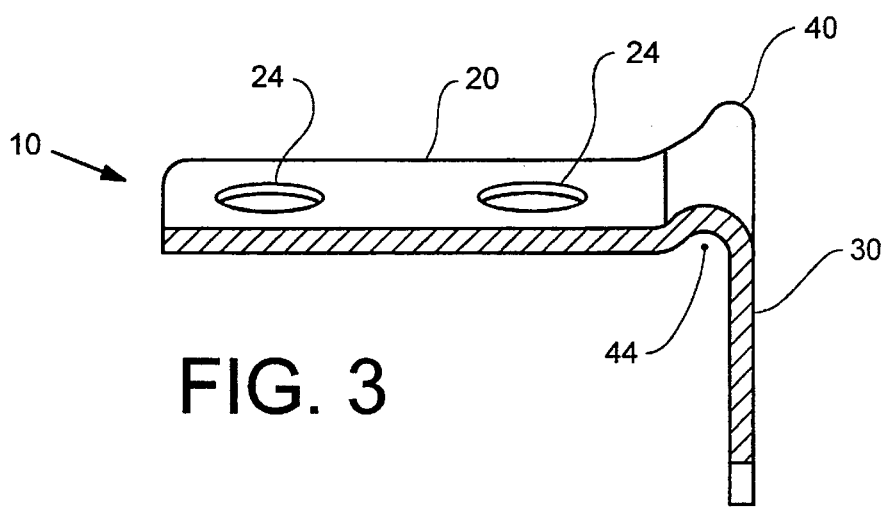
FIG. 3 is a section view of the end hook taken along the line 3—3 in FIG. 2.

The bend includes a ridge 40 between the shank 20 and the catch 30. As seen in FIG. 3, the ridge 40 is formed by a first bend from the plane of the shank 20 followed by a second bend in the opposite direction, thus providing a small recess 44 between the end of the shank 20 and the catch 30. When the end hook 10 is fastened to a measuring tape, the recess 44 provides a space to accommodate the end edge of the tape, which prevents buckling or bending at the end of the tape during use.

Referring again to FIG. 1, a longitudinal axis 12 extends the length of the shank 20. As seen in FIG. 2, the shank 20 is curved about the longitudinal axis 12 and is convex in the direction of the catch 30. Measuring tapes are also similarly curved to provide stiffness in the tape when the tape is extended from the housing.

The catch 30 is used to hook onto a reference edge of a thing being measured, and the catch may be provided with a nailing hole (not shown) or burrs on the inner surface to help hold to a reference edge. The catch 30 also prevents the free end of the tape from retracting into the housing.

Figure 4:
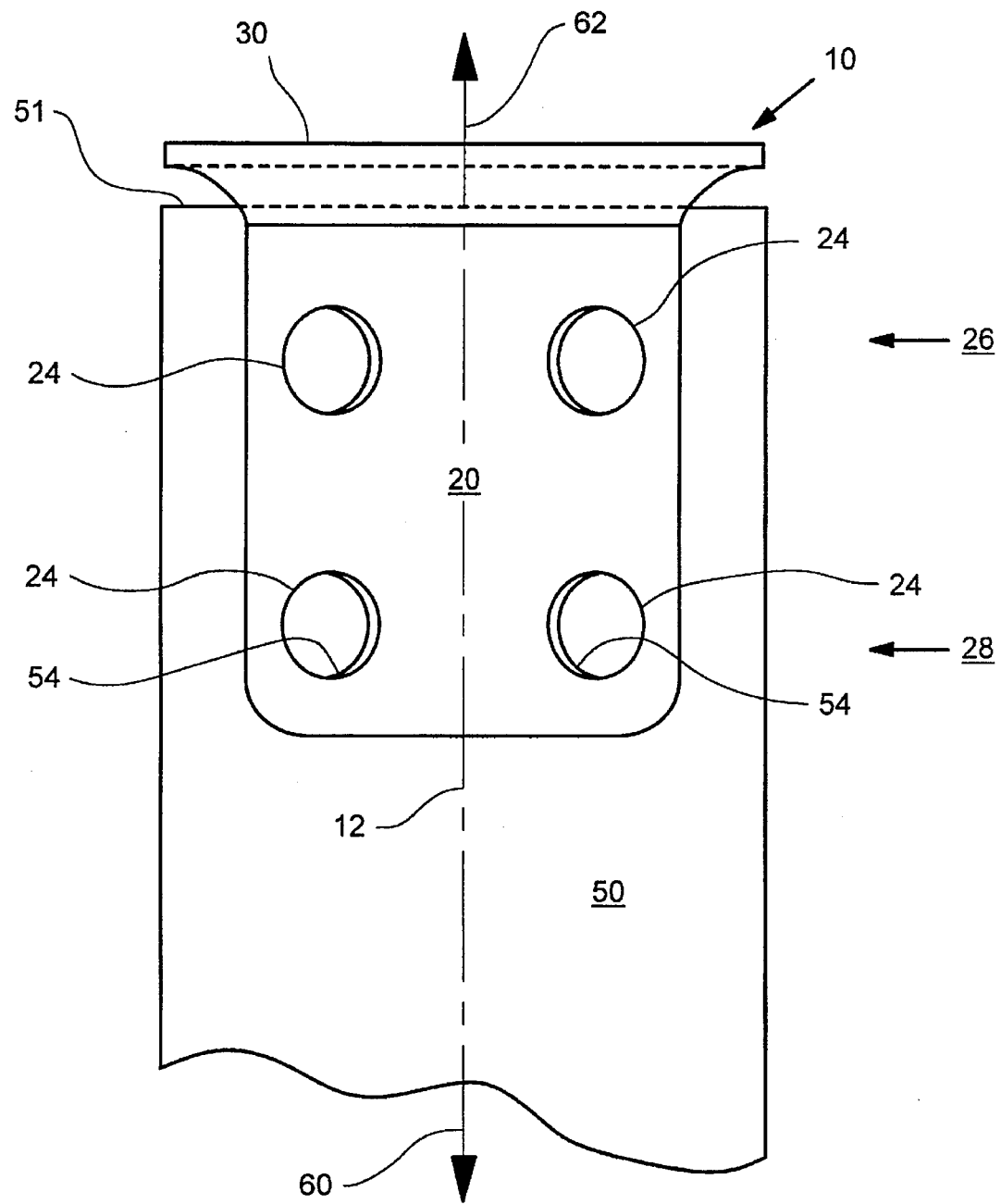
FIG. 4 is a top view of the end hook fastened to a free end of a measuring tape.

The shank 20 is provided with a plurality of fastening holes 24 for fastening the end hook to a measuring tape (shown in FIG. 4). As mentioned, a common problem in power return measuring tapes is breakage of the end of the tape where the end hook is fastened. The user typically releases a locking mechanism holding the tape in the extended position, which frees the power return spring to re-coil the tape. The retracting movement is stopped by the catch of the end hook striking the housing. The shock of the collision is transmitted from the end hook through the mounting rivets to the measuring tape. After repeated collisions, cracks appear in the tape, which eventually lead to the end of the tape breaking off.

Conventional fastening systems for end hooks typically include two or more rivet holes disposed along the longitudinal axis. Attempted solutions in the past have included adding a third rivet on the longitudinal axis, adding reinforcing material to the measuring tape, and positioning shock absorbing bumpers on the housing.

According to the invention, the fastening holes 24 are positioned laterally spaced from the longitudinal axis 12 of the shank 20. At the longitudinal axis the tape has its greatest curvature and becomes flatter toward the lateral edges. It is believed that one source of the common breakage problem is that the force of fastening a rivet on the longitudinal axis causes a local flattening of the curvature in the measuring tape. The local flattening is believed to cause small cracks in the material that become starting points for larger cracks. The region of the measuring tape laterally away from the longitudinal axis, which is relatively flat, is subject to much less deformation in fastening.

According to a preferred embodiment of the invention, as illustrated in FIG. 1, four fastening holes 24 are provided and are positioned symmetrically with two holes on each side of the longitudinal axis 12. As seen, the holes 24 form a first row 26 of two holes adjacent the catch 30 and a second row 28 of two holes longitudinally spaced from the first row.

FIG. 4 illustrates an end hook 10 in accordance with the invention in position for fastening to the free end of a measuring tape 50. The measuring tape 50 is provided with an equal a plurality of holes 54 positioned in an identical pattern as in the end hook 10. The end hook shank 20 is positioned on the free end of the tape 50 with the longitudinal axis 12 of the end hook aligned with a longitudinal axis of the measuring tape 50. The holes 24 in the shank 20 and the holes 54 in the measuring tape form aligned pairs for inserting a fastener therethrough.

The four hole pattern illustrated in FIG. 1 and FIG. 4 provides an advantageous distribution of the shock force both laterally to the relatively flat portions of the measuring tape 50 and longitudinally over a portion of the length of the tape. This configuration is believed to allow the tape to better absorb energy and significantly reduces the rate of breakage, as testing, further described below, has indicated.

The holes 24 in the shank 20 are elliptically or slot shaped, that is, longer in the longitudinal direction than in the lateral direction. This permits sliding of the end hook 10 relative to the end of the measuring tape 50 to account for the thickness of the catch 30 for accurate measurements whether the end hook 10 is hooked over an edge of an object being measured or abutted against an object for an inside dimension measurement.

Fasteners, typically rivets or similar suitable fasteners, are not illustrated in FIG. 4 so that relationship of the holes 24 in the shank 20 and the holes 54 in the measuring tape 50 can be seen. According to another aspect of the invention, the longitudinal spacing of the holes 24 in the shank 20 is greater than a longitudinal spacing of holes 54 in a measuring tape 50. This differential spacing helps to distribute the collision force between the first 26 and second 28 rows of holes for improved durability of the measuring tape 50.

This may be better understood by considering what occurs when the measuring tap 50 is retracted into the housing. As previously described, the power return spring will recoil the measuring tape, retracting the tape into the housing until the end hook 1 collides with the casing. At the time the collision occurs, the measuring tape 50 is acting under a force in the direction of the arrow 60. The collision of the end hook 10 on the casing produces a force in the direction of the arrow 62, thus placing the measuring tape 50 under a sudden tension.

The differential longitudinal spacing of the shank holes 24 and tape holes 54 results in the collision force being transmitted first through the first row 28 of holes to the rivets and measuring tape 50, slightly before the force is transmitted through the second row 28 of holes. Analysis by the inventor has shown that in conventional end hooks and tapes, the breakage more often occurs at the hole farthest from the catch portion of the end hook. The end hook according to the present invention puts the load first on the forwardmost portion of the tape, and then allows the farthest holes and rivets to take up force. According to a preferred embodiment, the longitudinal spacing of the fastening holes 24 of the shank 20 is 0.005 to 0.01 inches greater than the longitudinal spacing of the measuring tape holes. Spacing differentials less than 0.005 are also believed to be effective. The differential spacing may be created, for example, by the shank holes 24 having a greater longitudinal center-to-center difference than the holes in the measuring tape. Alternatively, the holes in the second row 28, that is, the holes farthest from the catch 30, may be slightly longer than the holes in the first row 26. It is thought that in conventional measuring tapes (in which the hole spacing on the end hook and the tape is identical), the dynamics of the collision result in most of the collision force being absorbed by the holes farthest from the catch, rather than more equally distributed.

Testing by the inventor has shown that the operational life of the measuring tape is greatly improved by the end hook 10 according to the invention. In cyclic endurance testing, a tape with an end hook according to the invention survived more than 2½ times as many collisions as a conventional end hook. A conventional end hook with longitudinally positioned mounting holes was found to survive in best cases about 3500 cycles before failure. By contrast, end hooks according to the invention repeated 10,000 to 11,000 cycles before failure.

The invention has been described in terms of preferred embodiments, however, it will be apparent to those skilled in the art that various changes, modifications, and the substitution of equivalent structure can be made without departing from the spirit and scope of the invention as defined in the following claims.

What is claimed is:

1. An end hook for a tape measure, comprising a shank having a longitudinal axis and a catch extending from the shank at an angle to the longitudinal axis, the shank being arcuately shaped about the longitudinal axis, and having four rivet mounting holes, the mounting holes positioned on each side of the longitudinal axis and all spaced laterally from the longitudinal axis.

2. The end hook as claimed in claim 1, wherein each mounting hole is slot shaped, being longer in the longitudinal direction than in the lateral direction.

3. The end hook as claimed in claim 1, wherein two mounting holes are positioned on each side of the longitudinal axis.

4. The end hook as claimed in claim 3, wherein the mounting holes are positioned symmetrically about the longitudinal axis.

5. The end hook as claimed in claim 1, wherein the shank and the catch meet at a bend having a J-shaped profile.

6. A retractable tape measure, comprising:

a measuring tape having a longitudinal axis and a free end, and having a plurality of mounting holes in the free end, two mounting holes being positioned on each side of the longitudinal axis and all holes spaced from the longitudinal axis; and an end hook having a shank with a longitudinal axis and a catch extending from the shank substantially perpendicular to the longitudinal axis, the shank being arcuately shaped about the longitudinal axis, and having four fastening holes, two fastening holes being positioned on each side of the longitudinal axis and all spaced laterally from the longitudinal axis, the shank overlying the end of the measuring tape with the respective longitudinal axes aligned, wherein the respective fastening and mounting holes form aligned pairs; and a plurality of fasteners, each fastener disposed in an aligned pair of holes to fasten the shank of the end hook to the free end of the measuring tape.

7. The tape measure as claimed in claim 6, wherein the mounting holes on the free end of the measuring tape and the fastening holes in the shank are positioned symmetrically about the respective longitudinal axes of the measuring tape and end hook.

8. The tape measure as claimed in claim 6, wherein the fastening holes in the end hook are slot shaped, a longitudinal dimension being greater than a lateral dimension.

9. The tape measure as claimed in claim 8, wherein a longitudinal center to center distance of the end hook fastening holes is greater than a longitudinal center to center distance of the measuring tape holes.

10. The tape measure as claimed in claim 8, wherein a longitudinal spacing of the holes in the shank is different than a longitudinal spacing of the holes in the measuring tape, so that movement of the end hook longitudinally toward an end edge of the free end of the measuring tape causes the holes in the end hook nearest the end edge to contact the respective fasteners before the holes furthest from the end edge contact the respective fasteners.

11. The tape measure as claimed in claim 8, wherein the fastening holes farthest from the catch have a longitudinal dimension greater than longitudinal dimension of the shank holes closer to the catch.

12. The end hook as claimed in claim 6, wherein the shank and the catch meet at a bend having a J-shaped profile.

13. A retractable tape measure, comprising:

a measuring tape having a longitudinal axis and a free end, and having four mounting holes, two holes being positioned on each side of the longitudinal axis and all holes being laterally spaced from the longitudinal axis; and an end hook having a shank with a longitudinal axis, the shank being arcuately shaped about the longitudinal axis, and having four fastening holes, two holes being positioned on each side of the longitudinal axis and all holes being laterally spaced from the longitudinal axis, the shank overlying the end of the measuring tape with the respective longitudinal axes aligned, wherein the respective fastening and mounting holes form aligned pairs for a fastener; and a plurality of fasteners, each fastener disposed in an aligned pair of holes to fasten the shank of the end hook to the free end of the measuring tape, wherein a longitudinal distance between the four fastening holes is greater than a longitudinal distance between the four mounting holes, so that movement of the end hook longitudinally toward an end edge of the free end of the measuring tape causes the holes in the end hook nearest the end edge to contact the respective fastener before the holes furthest from the end edge contact the respective fastener.

14. The tape measure as claimed in claim 13, wherein the mounting holes on the free end of the measuring tape and the fastening holes in the shank are positioned symmetrically about the respective longitudinal axes of the measuring tape and end hook.

15. The tape measure as claimed in claim 13, wherein the holes in the end hook are slot shaped, a longitudinal dimension being greater than a lateral dimension.

16. The end hook as claimed in claim 13, wherein the shank and the catch meet at a bend having a J-shaped profile.

* * * * *